United States Patent [19]
Kanamaru et al.

[11] Patent Number: 5,195,221
[45] Date of Patent: Mar. 23, 1993

[54] SLIDER WITH YOKE FOR SLIDE FASTENER AND ITS JOINING METHOD

[75] Inventors: Hisanobu Kanamaru, Ibaragi; Nobuhiro Ichikawa, Toyama; Hiroshi Yoshida, Toyama; Keiichi Keyaki, Toyama, all of Japan

[73] Assignee: Yoshida Kogyo K.K., Tokyo, Japan

[21] Appl. No.: 871,730

[22] Filed: Apr. 21, 1992

[30] Foreign Application Priority Data

Apr. 27, 1991 [JP] Japan ............................. 3-125064
Oct. 25, 1991 [JP] Japan ............................. 3-306998

[51] Int. Cl.⁵ ............................................ A44B 19/00
[52] U.S. Cl. ................................... 24/429; 24/419; 24/621
[58] Field of Search ............... 24/429, 419, 381, 621, 24/622, 625, 587

[56] References Cited

U.S. PATENT DOCUMENTS

| | | | |
|---|---|---|---|
| 582,475 | 5/1897 | Kempshall | 24/113 MP |
| 2,972,792 | 2/1961 | Johnson | 24/429 |
| 2,975,496 | 3/1961 | McGraw | 24/587 |
| 3,153,269 | 10/1964 | Berry | 24/429 |
| 3,349,451 | 10/1967 | Maeno | 24/621 |
| 4,823,447 | 4/1989 | Akashi | 24/419 |

FOREIGN PATENT DOCUMENTS

| | | | |
|---|---|---|---|
| 0688519 | 6/1964 | Canada | 24/621 |
| 0582564 | 12/1924 | France | 24/621 |
| 53-27653 | 8/1978 | Japan | |
| 62-41608 | 10/1987 | Japan | |
| 0495390 | 11/1938 | United Kingdom | 24/429 |
| 0799146 | 8/1959 | United Kingdom | 24/587 |

Primary Examiner—Victor N. Sakran

[57] ABSTRACT

A novel and improved slider with a yoke for a slide fastener and a novel and improved method for attaching or joining the yoke to the slider body, which may be carried out in simple operation to be attractive in appearance and to provide firm combination between the yoke and the slider body.

The front and rear support posts the slider body are respectively provided with locking groove and the contact faces of the yoke are also provided with bulged portions opposite to the locking grooves. In a preferred embodiment, after the support posts are covered with the yoke, a press force is applied to the bulged portion in the forging process to flow the material of the bulged portion into the locking groove so as to provide the firm combination.

In the other preferred embodiment, after the yoke is covered on the support posts and is pressed in the deeply covering direction, a part of each support post is deformed by plastic flow to form a bulged portion in the locking groove of the yoke so as to combine the yoke with the support posts.

7 Claims, 7 Drawing Sheets

SLIDER WITH YOKE FOR SLIDE FASTENER AND ITS JOINING METHOD

BACKGROUND OF THE INVENTION

1. Field of the Invention

This invention relates to a slider for opening or shutting a slide fastener, particulary a slider with a yoke which is firmly joined to a pull tab supporting face of a slider body, and an assembling method for firmly joining the yoke to the slider body.

2. Prior Art

There have hitherto been proposed the yokes attached to the sliders which have functions for supporting a pull tab and for holding and covering a finger tip inserted into a slider and a leaf spring imparting resilience to the finger tip or being formed integral with the finger tip. The conventional yoke joining means have been disclosed for examples, in JP, Y no.62-41608 (Japanese Utility Model Publication) and in JP, B no.53-27653 (Japanese Patent Publication).

In the former, the front and rear support posts formed in the slider body are respectively provided with locking grooves. The yoke portions opposite to the locking grooves are clamped and pressed by use of a punch from the outward position to attach or join the yoke and the support posts each other.

In the latter, the support posts are also provided with the locking grooves. Then, parts of the yoke for covering the support posts are deformed by the punch and interengaged with the recesses to provide the combination between the support posts and the yoke.

In the above-mentioned conventional joining means, since the external face of the yoke is processed by the punch, the punch traces leave on the external face of the yoke. When the parts of the yoke are deformed, the punch depressions are produced on the external face of the yoke and the thickness of the deformed parts becomes thin. The depression due to the punch looks like injury to become less attractive in appearance. Accordingly, when the slide fastener with the slider is attached to a high class bag, the commercial value is considerably reduced. The thinned parts due to the deformation become less reliable in attachment strength and poor durability.

SUMMARY OF THE INVENTION

It is therefore an object of this invention to overcome the above-mentioned disadvantages and to provide a novel slider with a yoke for a slide fastener and its assembling method for firmly and stably joining a yoke to s slider body in combination by plastic flow.

An other object of this invention is to provide a novel and improved slider with a yoke for a slide fastener and its assembling method wherein the yoke can be joined to support posts of a slider body without leaving depressions on the external face of the yoke thereby to be attractive in appearance and to produce firm attachment strength and increased durability.

A further object of this invention is to provide an improved method for integrally joining a yoke to a slider body so as to produce an attractive appearance without exposing the joining means and a high joining strength.

An additional object of this invention is to provide an improved method for joining a yoke to support posts of a slider body for a slide fastener, wherein the conventional processing machine and apparatus may be used without requiring the novel machine and apparatus to provide inexpensive and mass production.

To accomplish the aforementioned objects of this invention, some improved slider with yoke for slide fastener are provided that front and rear support posts are protruded from a pull tab supporting surface of a slider body within the yoke joining place. In a preferred slider, the support posts are formed with locking groove on the upright faces thereof. The yoke is provided with bulged portion opposite to the locking groove and is covered on the front and rear support posts. The bulged portion of the support posts are deformed in the forging process to flow the composition material thereof into the locking grooves so as firmly to join the yoke to support posts.

In an other preferred slider, the yoke is contacted with the side faces of the support posts. Either one of the yoke and the support posts is provided with locking grooves, and the other is plastic-deformed into the grooves to produce the bulged portion therein by plastic flow so as integrally to interlock the yoke and the support posts. The locking grooves are provided on the contact faces of the yoke contacted with the support posts in the longitudinal direction of the yoke.

Moreover, concave grooves are provided on the contact faces of the support posts contacted with the yoke in the up and down direction and are respectively connected through stepped shoulders with downwardly tapered locking grooves. The yoke is provided with the linear projection opposite to the concave and locking grooves of the support posts.

Furthermore, some novel and improved methods are also provided to accomplish the aforementioned objects of this invention. Firstly, a method for joining a yoke to a slider body is characterized by the steps of, forming locking grooves on contact faces in either one of a yoke and support posts, preparing extra thickness such as projections in the other flowing into the locking grooves by the plastic deformation, forcibly urging the yoke toward the support posts from the upper position of the support posts while holding both side faces of the yoke in the width direction by means of holder tools, and thereby flowing the projections into the locking grooves by the plastic deformation to form the bulged portion.

Nextly, an other method is characterized by the steps of, forming a slider body and simultaneously forming front and rear support posts which are disposed within the yoke joining place and which are provided with locking grooves on the upright faces of the support posts, covering the support posts with the yoke, and thereafter flowing a part of material of the yoke into the locking grooves of the support posts by press force in the forging process to form bulged portions.

Moreover, a further method according to the above other method is characterized by the steps of, forming locking grooves on both side faces in a front support post and a locking groove on a back face in a rear support post, forming a projection in a yoke opposite to the back locking groove of the rear support post, interlocking the prjection of the yoke with the locking groove of the back face, and forming bulged portions in the locking grooves of the support posts by press force in the forging process after covering both support posts with the yoke.

According to the slider with the yoke for the slide fastener of this invention, the upright faces of the support posts are provided with locking groove and the yoke is also provided with projections opposite to the locking groove. Since the projections are plastic-flowed into the locking portions by press force in the forging process to join the yoke to the slider body, the joining means is not exposed on the outside of thus joined yoke to provide the smooth surface and to promote the appearance considerably attractive. In the aforementioned processing, the material plastic-deformed from the projections and led into the locking grooves is flowed firmly to the internal faces of the locking grooves to form bulged portions, so that the yoke can be integrally joined to the slider body and can be stably maintained for a long time at the firmly joined state.

According to the other slider with the yoke for the slide fastener, either one of the yoke and the support posts is provided with the locking grooves. The material of the other is plastic-deformed and flowed into the locking grooves to join the one to the other to form bulged portions. The yoke can be also integrally joined to the slider body without leaving the processing traces on the outside of the joined yoke to promote the attractive appearance. The interlocking portions of the yoke and the support posts may be stably maintained and firmly combined each another.

Moreover, according to the method of joining the yoke to the slider body in the slide fastener of this invention, the method comprises the steps of forming locking grooves in the support posts, forming bulged portions in the yoke, and forging the projections. Therefore, in the processing, novel machine and apparatus are not required and the slider with the yoke may be processed by use of the conventional machine and apparatus. The slider with the yoke may be inexpensively produced in the mass production.

In the other method of joining the yoke to the slider body in the slide fastener, even if the plastic deformation is carried out, the yoke and the support posts are formed of the simple construction. The yoke can be joined to the support posts in the covering and pressing processes, so that the method may be carried out by use of simple joining means in the rapid joining process.

These and other objects and advantages of this invention will be better understood from the following detailed description taken in connection with the accompanying drawings which illustrate by way of example preferred embodiments of this invention.

DETAILED DESCRIPTION OF THE INVENTION

Figure 4:
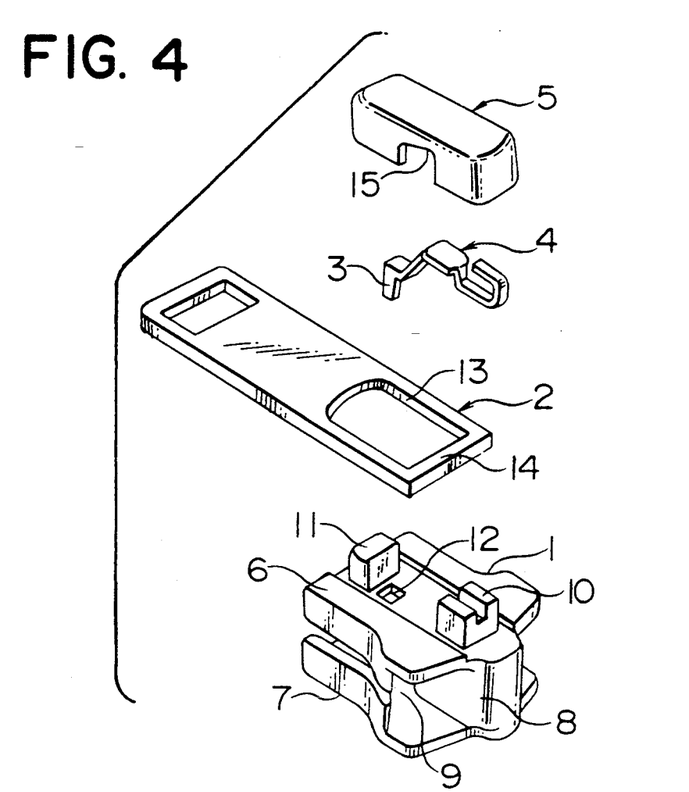
FIG. 4 is an exploded and perpective view of a slider with a yoke joining means according to this invention.
Figure 5:
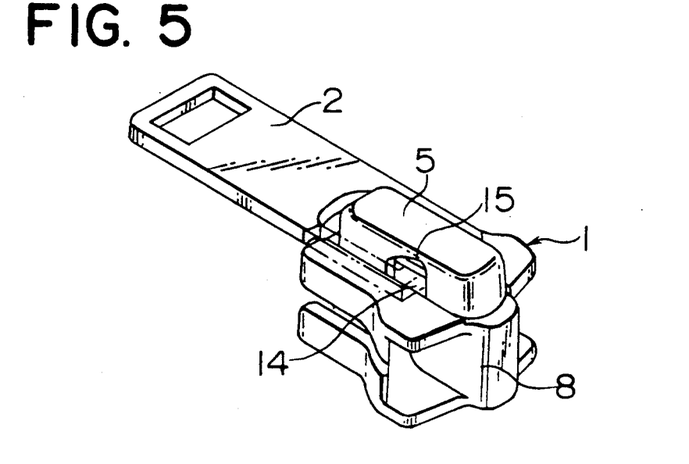
FIG. 5 is a perspective view of a slider with a yoke joining means according to this invention.

Referring now to a slider according to this invention, as shown in FIG. 4 and FIG. 5, this slider comprises a slider body 1, a pull tab 2, a leaf spring 4 with a finger tip 3 and a yoke 5.

The slider body 1 comprises a pair of parallelly disposed upper and lower wings 6 and 7, a Y-shaped element guide channel 9 formed between the upper and lower wings 6 and 7, a connection post 8 disposed in the end of the slider body and formed integral with the upper and lower wings 6, 7, support posts 10 and 11 integrally projected from the front and rear positions of the upper wings 6, and an aperture 12 for receiving a finger tip 3 of a leaf spring 4 to be guided into the element guide channel 9. The slider body 1 is manufactured in a press forming process or a die cast forming process.

The pull tab 2 is made of a plate material and has a trunnion 14 formed in one end side of the pull tab 2 and a large aperture 13 formed in the end portion. The trunnion 14 is put between the both front and rear support posts 10, 11 of the slider body 1. The pull tab 2 is turned forward and rearward about the pivotal trunnion 14 set in an opening 15 of a yoke 5.

A leaf spring 4 is composed of an inverted U-shaped front portion, a flat central portion, and a finger tip 3 projected downwardly in the rear portion. This leaf spring 4 is also put between the both front and rear support posts 10 and 11 of the slide body 1 to cross over the trunnion 14 of the pull tab 2. Then, the finger tip 3 of the leaf spring 4 is inserted into aperture 12 opened to the slider body 1.

The yoke 5 is formed of a hollow cap opened downwardly and U-shaped in the cross section to cover the both front and rear support posts 10, 11. The yoke 5 is provided with openings 15 which are opened in the longitudinal central sides of the yoke 5 to set the trunnion 14 of the pull tab 2 therein.

The slider is basically constituted generally in the same construction to the conventional slider, and this invention relates to a novel construction for joining the yoke 5 and the front and rear support posts 10, 11. The joining construction according to this invention will be illustrated in detail thereinafter.

Figure 1A:
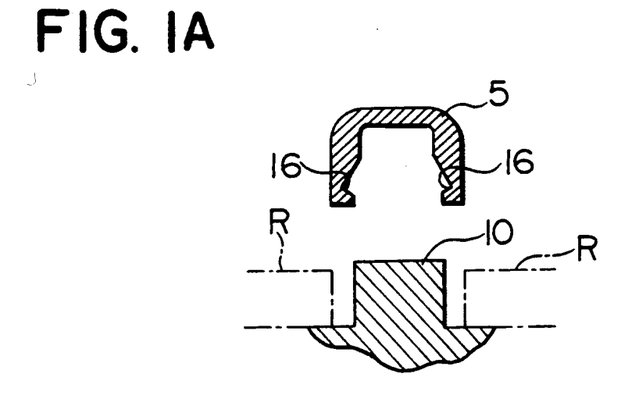
FIG. 1(A) is a sectional view of a slider with a yoke at the state before joining the yoke according to this invention.

As shown in FIG. 1(A), the yoke 5 is provided with V-shaped locking grooves 16 which are formed on the internal side faces thereof along the whole longitudinal direction thereof or only opposite to the front and rear support posts 10, 11. The opened lower end of the yoke 5 is formed approximately at the same width as the support posts 10, 11, so that the support posts 10, 11 are engaged in the yoke without resistance. In the hollow yoke 5, the internal wall extended upwardly from the bottom is inclined outwardly to the maximum depth of the V-shaped groove and reversely or inwardly from the maximum depth. In the upper portion of the inclined wall, the hollow space is formed at the narrower width than that of the support posts 10, 11. The yoke 5 is made of the material having the approximate same hardness as the material of the support posts 10, 11 or the slider body 1, and prefeably made of the material having the higher hardness than that of the support posts.

Figure 1B:
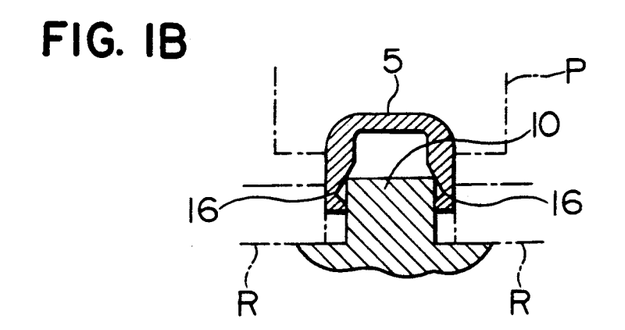
FIG. 1(B) is a sectional view of a slider with a yoke at the state during joining the yoke.
Figure 1C:
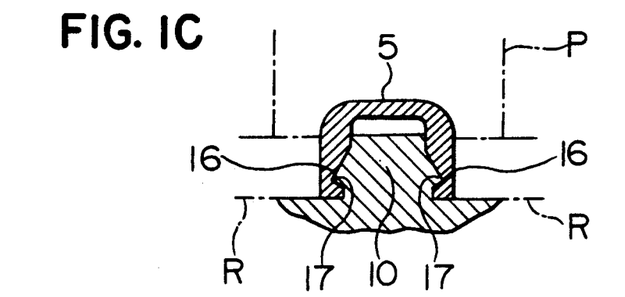
FIG. 1(C) is a sectional view of a slider with a yoke at the state after joining the yoke.

The yoke 5 is joined to the front and rear support posts 10, 11 and since the joined states of the support posts 10, 11 are the same states, the only support post 10 is illustrated in FIG. 1(B) and FIG. 1(C).

As the aforementioned, the internal space of the yoke 5 is formed at the narrower width than that of the support post 10, so that when the yoke 5 is engaged with the support post, it is inserted only up to the intermediate portion of the support post 10. Then, when the press force is applied to the yoke 5 from the upward position thereof by use of a punch P, the yoke 5 is forcibly urged toward the support post 10 to be spread outwardly.

Therefore, while the both side of the yoke 5 are held by means of holder tools R, the yoke 5 is forcibly urged to the support post 10. Then, the support post 10 results in the plastic deformation to narrow the upper end portion of the support post 10 so as to insert the upper portion of the support post into the upward space of the yoke 5. Moreover, the extra material produced when narrowed, is flowed into both right and left locking grooves 16 of the yoke 5. In this process, bulged portions 17 are formed in the locking grooves 16 from the support post 10 to join the yoke 5 firmly to the support post 10 in accordance with the engagement of the bulged portions 17 and the locking grooves 16.

Figure 2A:
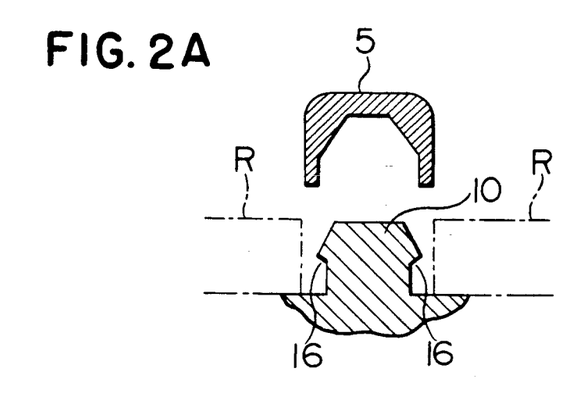
FIG. 2(A) is a sectional view of a slider with a yoke at the state before joining the yoke in an other modification according to this invention.

As shown in FIG. 2(A), the support post 10 is provided with the locking grooves 16, and the other support post 11 is omitted in the illustration. The head portion of the support post 10 is inclined outwardly toward the both sides and the lower portion of the support post 10 serves to form the locking groove 16. The support posts 10, 11 are preferably made of the material having the higher hardness.

The opening lower end of the yoke 5 is formed at the approximate same width as the widest head portion of the support post 10, and the hollow space of the yoke 5 is formed to gradually narrow the width from the intermediate position in the vertical direction.

Figure 2B:
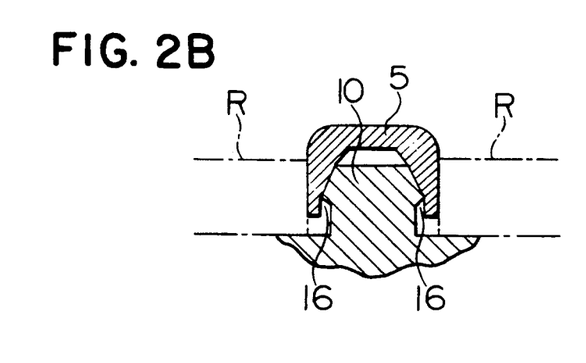
FIG. 2(B) is a sectional view of a slider with a yoke at the state during joining the yoke.
Figure 2C:
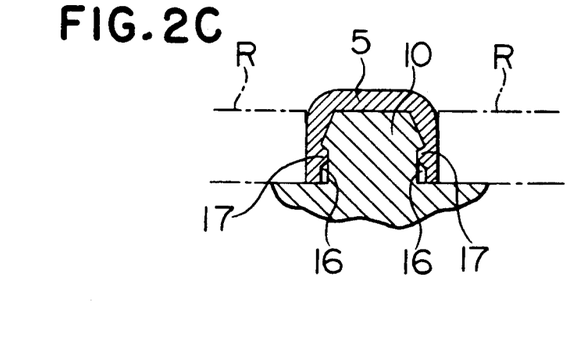
FIG. 2(C) is a sectional view of a slider with a yoke at the state after joining the yoke.

In joining the yoke 5 to the slider body 1, as shown in FIG. 2(B) and FIG. 2(C), after the yoke 5 is engaged with the support post 10, a press force is applied to the yoke 5 by use of the punch (not shown). The head portion of the support post 10 is forcibly urged into the yoke 5 to flow the material of the yoke 5 into the locking grooves 16 of the support post 10 in the plastic flow operation, so that the plastic-deformed bulged portions 17 are formed on internal faces of the yoke 5 to firmly join the yoke 5 and the slider body 1 each other. Then, the yoke 5 is held by holder tools R from the both sides to prevent the deformation of the shape thereof.

Figure 3A:
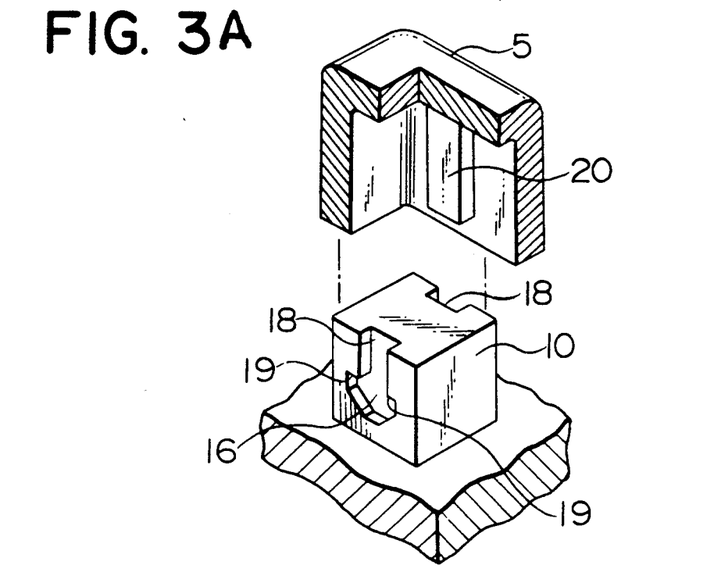
FIG. 3(A) is a sectional view of a slider with a yoke at the state before joining the yoke in a further modification according to this invention.

Moreover, as shown in FIG. 3(A), the support post 10 is provided with concave grooves 18 and locking grooves 16 and the other support post 11 is omitted in the illustration. The concave grooves 18 are formed on the both sides of the support post 10 in the up and down direction thereof. The locking grooves 16 are continuously connected to the concave grooves 18 and are provided with shoulders 19 extended toward the both sides. The individual locking groove is formed of the wide upper portion and the taper lower portion which is gradually tapered from the shoulder in accordance with reaching downward.

In an other hand, the internal wall of the yoke 5 opposite to the support post 10 is provided with a linear projection 20 for engaging in the concave groove 18. The linear projection 20 is formed of such length as that it is reached to the lower end of the locking groove 16 and more is urged toward the lower end even if the yoke 5 is contacted to the upper surface of the slide body 1.

Figure 3B:
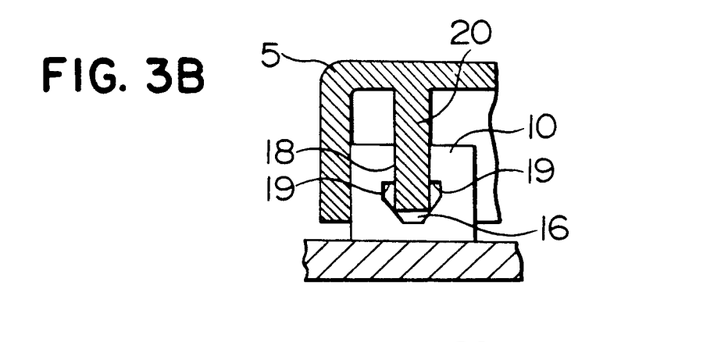
FIG. 3(B) is a sectional view of a slider with a yoke at the state during joining the yoke.
Figure 3C:
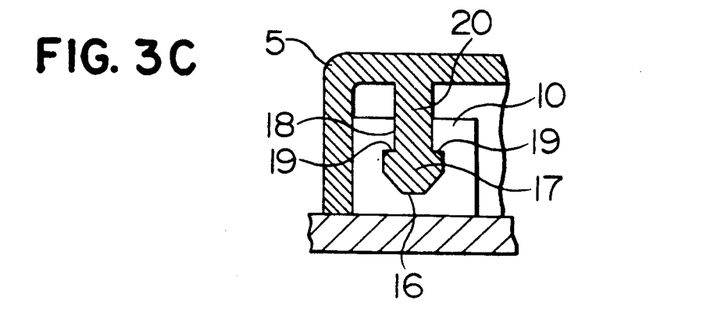
FIG. 3(C) is a sectional view of a slider with a yoke at the state after joining the yoke.

In joining the yoke 5 to the slider body 1, as shown in FIGS. 3(B) and (C), when the yoke 5 is engaged in the support post 10, the linear projection 20 of the yoke 5 is led through the concave groove 18 up to the intermediate portion in the locking groove 16. Then, when the press force for pushing the yoke downwardly is applied to the yoke 5, the lower portion of the linear projection 20 results in the plastic deformation and flows to form a bulged portion 17 in the locking groove 16, so that the yoke 5 is integrally engaged with the slider body 1 to be unable to disengage the yoke 5 from the slider body 1. The bulged portion 17 is expanded to the larger width than the width of the linear projection 20. In joining, the yoke 5 is held by holders (not shown) from the both sides to prevent the deformation of the yoke shape.

Figure 7:
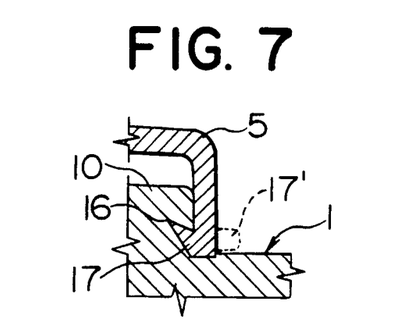
FIG. 7 is a main sectional view of a yoke joining means of a slider to which a yoke is also joined in the other modification of this invention.
Figure 8:
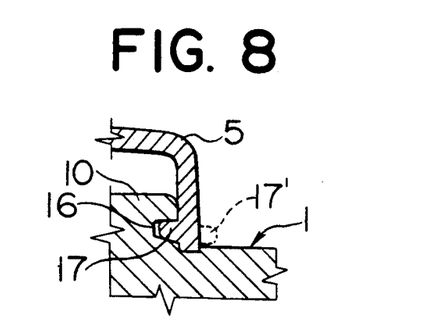
FIG. 8 is a main sectional view of a yoke joining means of a slider to which a yoke is joined in the further modification of this invention.
Figure 9:
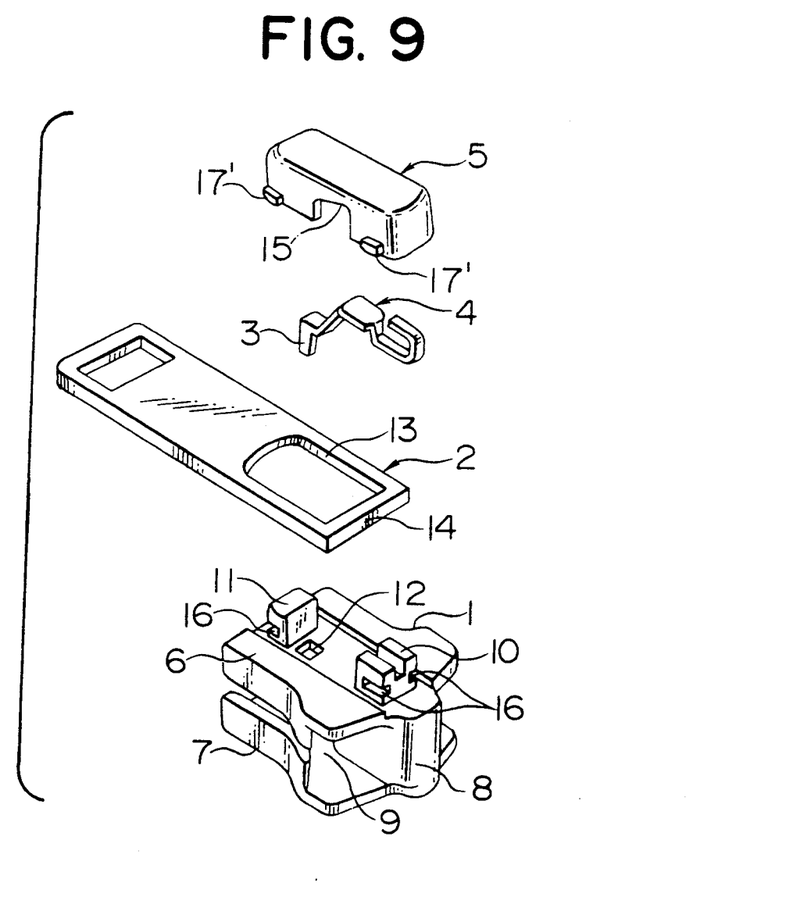
FIG. 9 is an exploded and perspective view of a slider with a yoke joining means according to this invention.

Referring to FIG. 6 and FIG. 9, individual locking groove 16 is formed in upright faces, particularly in respective both sides faces of the front and rear support posts 10, 11 projected from the slider body 1. The locking groove 16 is V-shaped as shown in FIG. 6, or formed as shown in FIG. 7 such that a V-shaped concave portion is inclined upwardly. The acute shaped tip of the locking groove 16 is not always required and may be formed squarely as shown in FIG. 8.

Figure 6A:
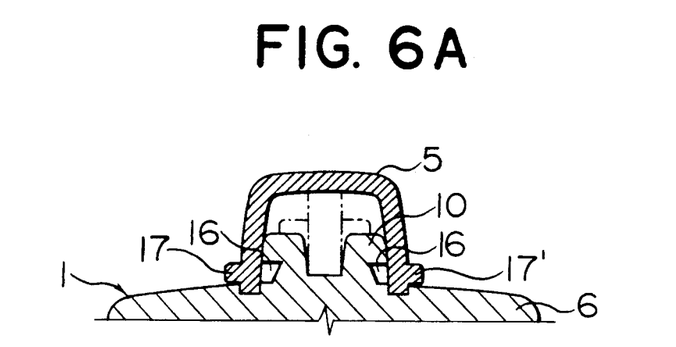
FIG. 6(A) is a sectional view of a yoke joining means of a slider in an other modification of this invention at the state that support posts are covered with the yoke.

On the other hand, the yoke 5 as shown in FIG. 6(A) and and FIG. 9 is provided with projections 17' which are respectively projected outwardly from the external face of the yoke 5 at the position opposite to the individual locking groove 16 of front support post 10 when the yoke 5 is put and covered on the both front and rear support posts 10, 11 as above-mentioned.

Since the support posts 10, 11 are respectively provided with the locking grooves 16 and the yoke 5 are provided with the projections 17', when the yoke 5 will be assembled to the slider body 1, the yoke 5 is covered onto the slider body 1 as shown in FIG. 6(A) after the trunnion of the pull tab 2 and the leaf spring 4 are put between the front and rear support posts 10 and 11 of the upper wing 6.

Figure 6B:
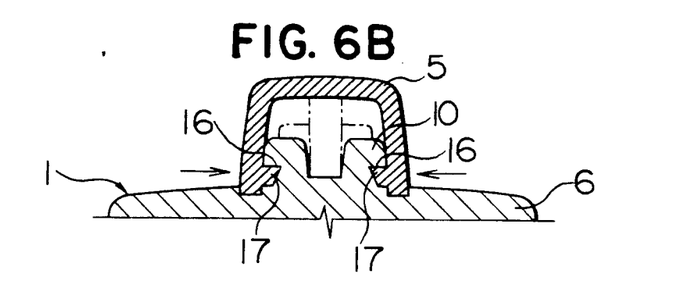
FIG. 6(B) is a main sectional view of a slider of this invention to which a yoke is also joined.

After thus covered with the yoke 5, the projections 17' of the yoke 5 is plastic-deformed by press forces (shown by arrows) in the forging process of flow the material of the deformed projections 17' into the locking grooves 16 of the support posts 10, 10, and to form bulged portions 17 therein. Flatten smooth faces on the yoke 5 are finished up, as shown in FIG. 6(B). Then, the material of the yoke 5 is flowed in the locking grooves 16 and firmly contacted with the locking grooves 16 thereby to join the yoke 5 to the front and rear support posts 10, 11 without leaving processing traces on the external face of the yoke 5 so as to provide attractive appearance.

Figure 10:
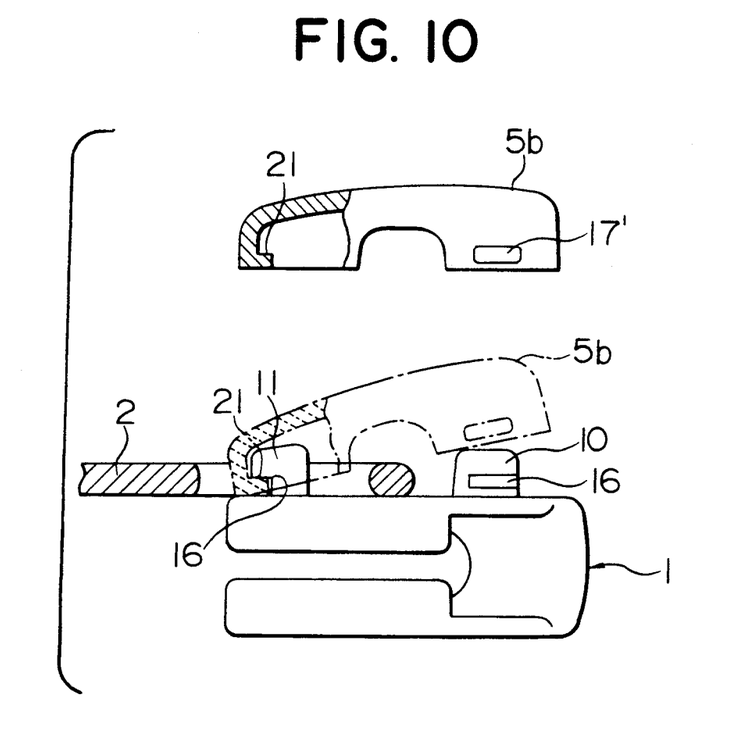
FIG. 10 is a side view of the further modification of the yoke joining means according to this invention.

Referring to the slider shown in FIG. 10, both side faces of the front support post 10 are provided with locking groove 16 and a back face of the rear support post 11 is provided with a locking groove 16. On the other hand, the yoke 5 is provided with a claw 21 for interlocking with the back locking groove 16. The external face of the yoke 5 is provided with projections 17' opposite to the front locking grooves 16 as well as the embodiment shown in FIG. 6.

In this slider, as shown by chain line in FIG. 10, after the claw 21 in the rear side of the yoke 5 is interengaged with the back locking groove 16 of the rear support post 11 and the front portion of the yoke 5 is covered on the front support post 10, the press forces in the forging process are applied to the front projections 17' to join the yoke 5 to the slider body 1.

What is claimed is:

1. A slider for a slide fastener comprising:
   a yoke joined to a supporting face of a slider body;
   front and rear support posts being protruded upright from said slider body; and
   either one of said yoke or said support posts being provided with locking grooves on the contact face;
   wherein said yoke covers said support posts and is forcibly contacted with the side faces of said support posts; and
   wherein the material of the other is plastic-deformed by a forging process caused by said forcible contact, and flows into said locking grooves by plastic flow to form a bulged portion in said each locking groove.

2. A slider with a yoke for a slide fastener according to claim 1, wherein the contact face of said yoke is provided with a locking groove in the longitudinal direction of said yoke, and wherein the contact faces of said front and rear support posts which are protruded upright from said slider body are plastic-deformed by said forging process and the materials of said support posts flow into said locking groove to form said bulged portions.

3. A slider for a slide fastener comprising:
   a yoke joined to a supporting face of a slider body,
   front and rear support posts being protruded upright from said slider body, said support posts being provided with locking grooves on the contact faces which contact with an inner surface of said yoke;
   wherein the contact faces of said each support post is provided with concave grooves and downwardly tapered locking grooves, said each concave groove being disposed in the up and down direction of said support post and connected through stepped shoulders with said locking groove,
   wherein the contact faces of said yoke are provided with linear projections opposite to the concave grooves; and
   wherein the lower parts of said linear projections are plastic-deformed by a forging process to flow the materials of said linear projections into said locking grooves to form bulged portions.

4. A slider for a slide fastener comprising:
   a yoke joined to a supporting face of a slider body;
   front and rear support posts being protruded upright from said slider body;
   said support posts being provided with locking grooves on the contact faces;
   said yoke covering said posts and contacting with the contact faces of said posts;
   projections formed on an outer surface of said yoke in the positions corresponding to said locking grooves,
   wherein said locking grooves are formed on the upright faces of said support posts; and
   wherein said projections of said yoke are plastic-deformed by a forging process to flow the materials of said projections into said locking groove to form bulged portions.

5. A yoke joining method for contacting and joining a yoke to front and rear support posts protruded from a slider body for a slide fastener at the covered state of said yoke comprising the steps of:
   forming locking grooves on contact faces in either said yoke or said support posts;
   preparing extra material flowing into said locking grooves by plastic deformation in the other; and
   forcibly urging said yoke toward said support posts from the upper position thereof to plastic-deform said extra material by a forging process so that said extra material flows into said locking grooves by plastic flow while holding the both sides of said yoke in the width direction by holders.

6. A yoke joining method for a slider for a slide fastener comprising the steps of:
   forming a slider body with front and rear support posts which are disposed within the yoke joining place on a pull tab supporting face and which are provided with locking grooves on the upright faces of said support posts;
   forming projections on an outer surface of said yoke in the positions corresponding to said locking grooves of said support posts;
   flowing materials of said projections into said locking grooves by press forces in a forging process after covering said support posts said yoke; and
   forming bulged portions on an inner surface of said yoke inside said locking grooves.

7. A yoke joing method for a slider for a slide fastener according to claim 6, wherein said method comprises the steps of:
   forming locking grooves on both side faces of a front support post and a locking groove on a back face of a rear support post;
   forming a claw on an inner surface of said yoke opposed to the back locking groove of said rear support posts;
   interlocking said claw of said yoke with said back locking groove of said rear support posts; and
   flowing the materials of said projections into said locking grooves of said support posts by press forces in the forging process after covering said both support posts with said yoke.

* * * * *